(12) United States Patent
Choi et al.

(10) Patent No.: US 7,263,118 B2
(45) Date of Patent: Aug. 28, 2007

(54) INTERFERENCE CANCELING DEVICE AND METHOD IN MOBILE COMMUNICATION SYSTEM

(75) Inventors: In-Kyeong Choi, Daejeon (KR); Seong-Rag Kim, Daejeon (KR); Jin-Kyu Choi, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 616 days.

(21) Appl. No.: 10/331,783

(22) Filed: Dec. 31, 2002

(65) Prior Publication Data

US 2003/0202568 A1 Oct. 30, 2003

(30) Foreign Application Priority Data

Oct. 22, 2002 (KR) .................. 10-2002-0064412

(51) Int. Cl.
*H04L 27/30* (2006.01)
(52) U.S. Cl. .................. 375/144; 375/148; 375/349
(58) Field of Classification Search ............ 375/148, 375/144, 346, 349
See application file for complete search history.

(56) References Cited

U.S. PATENT DOCUMENTS

| 5,467,368 | A | * | 11/1995 | Takeuchi et al. ............. 375/148 |
| 6,034,952 | A | | 3/2000 | Dohi et al. |
| 6,088,383 | A | * | 7/2000 | Suzuki et al. ............... 375/148 |
| 6,473,451 | B1 | * | 10/2002 | Seki et al. .................. 375/142 |
| 2001/0019577 | A1 | * | 9/2001 | Ha ........................ 375/148 |
| 2002/0012383 | A1 | * | 1/2002 | Higuchi et al. ............. 375/141 |

FOREIGN PATENT DOCUMENTS

| KR | 10-1999-0054870 | 7/1999 |
| KR | 10-0255565 | 2/2000 |
| WO | WO 00/49724 | 8/2000 |

OTHER PUBLICATIONS

Seong Rag Kim et al., "Multi-Mode Subtractive interference Cancellation for Asynchronous Multi-Path Channels," 1999 IEEE, pp. 1430-1434.*
Dariush Divsalar et al., "Improved Parallel Interference Cancellation for CDMA," 1998 IEEE, pp. 258-268.*
Carl S. Wijting et al.; "Groupwise Serial Multiuser Detectors for Multirate DS-CDMA"; 1999 IEEE.

(Continued)

*Primary Examiner*—Dac V. Ha
(74) *Attorney, Agent, or Firm*—Lowe Hauptman & Berner LLP

(57) ABSTRACT

An interference canceller is herein disclosed wherein a baseband signal is input to a detector's fingers, and the fingers detect multi-path signals and estimate the baseband signal's channel. An MRC uses the finger's despread signal and the channel estimate to output a soft bit decision value, while a signal regenerator uses a hard bit decision value and the finger's channel estimate to regenerate the baseband signal. An SIR measurer uses a soft bit decision value and a despreader's channel estimate to measure an SIR. A signal selector compares each detector's SIR measurement value with a target SIR, and when the SIR measurement value is greater than the target SIR, it selects the detector's regeneration signal to group received signals. A subtractor subtracts the regeneration signal from the baseband signal.

8 Claims, 2 Drawing Sheets

OTHER PUBLICATIONS

Seong Rag Kim et al.; "Multi-Mode Subtractive Interference Cancellation for Asynchronous Multi-Path Channels"; 1999 IEEE; pp. 1430-1434.

A.F. van Meeteren et al.; Groupwise Weighted Parallel Interference Cancellation for Asynchronous Multirate DS-CDMA; 1999 IEEE; pp. 1820-1824.

* cited by examiner

INTERFERENCE CANCELING DEVICE AND METHOD IN MOBILE COMMUNICATION SYSTEM

BACKGROUND OF THE INVENTION (a) Field of the Invention

The present invention relates to an interference canceling device and method in a mobile communication system. More specifically, the present invention relates to a groupwise interference canceling method in a CDMA (code division multiple access) system for reducing multiple access interference.

(b) Description of the Related Art

In the CDMA system, since each mobile station uses a particular spreading code to receive mixed signals transmitted through an identical frequency band, the performance of the system is lowered because of multiple access interference generated when the received signals are despread. Hence, a subtractive interference cancellation method for removing other users' signals, that is, interference signals, from the received mixed signals of a plurality of users has been proposed so as to increase performance and capacity of the system. The subtractive interference cancellation method includes the SIC (successive interference cancellation) method for canceling the interference signals one by one, and the PIC (parallel interference cancellation) method for concurrently canceling them. The SIC method improves the system performance but causes time delays, and hence, it is difficult to realize the SIC method in an actual system. The PIC method deteriorates the performance in a multi-path fading environment having substantial channel variations. To compensate for the demerits of the subtractive interference cancellation method, methods for dividing the interference into groups and canceling the interference for each group have been proposed.

The methods for canceling the interference of the respective groups include a method for grouping signals according to signal power and sequentially selecting the signals in order of start from a group of high signal power to cancel the interference; a method for providing weights to the respective groups and concurrently canceling the interference; and a method for grouping the signals for each finger according to the power of the received signals, selecting groups in order of from the group of high signal power, subtracting a corresponding regeneration signal to cancel the interference, adding the regeneration signal again in a next interference canceling stage, and repeating these stages for each interference stage.

The above-described conventional interference canceling methods divide the signals into groups in consideration of the power of the transmission signals, data speeds in multiple transmissions, intensities of received signals, or output values of a maximal ratio combiner (MRC). However, in the multiple path fading channel environment, the signal power at the time of receiving the signals may be very weak even when strong signals have been transmitted, and so if these signals are selected for interference cancellation, the performance is deteriorated. Also, respective signals have different bit lengths in the case of multiple data speed transmissions, and signals of high instant bit energy have higher reliabilities than those of high instant power at the time of receipt, and accordingly, consideration of received signal powers problematically generate incorrect regeneration signals for subtraction.

Further, the conventional grouping methods require pre-definition of a number of signals for each group for canceling the interference, or the number of signals for each group is predefined according to transmission speeds. However, an optimal value of the number of signals for each group is not previously known, and when the number of signals for each group is predefined according to the transmission speed, accurate grouping may not be executed in the multi-path fading channel environment.

SUMMARY OF THE INVENTION

It is an object of the present invention to provide a groupwise interference canceller by grouping received signals according to required bit error rates (BER) of a mobile communication system. The target SIR can be determined by the required BER in the system present The present invention measures SIRs of received signals and groups the signals using the SIR measurement values by comparing them with the target SIR.

In one aspect of the present invention, an interference canceller comprises an interference cancellation section for receiving a baseband signal and canceling interference, and a final decision unit for receiving signals from the interference cancellation section to perform a hard bit decision. The interference cancellation section includes a first interference cancellation unit including a plurality of first detectors connected in parallel, a signal selector, and a subtractor. The signal selector compares SIR measurement values respectively measured by the first detectors with a predetermined target SIR, and selects regeneration signals that have SIR measurement values greater than the target SIR and that are regenerated by the first detectors. The subtractor subtracts the regeneration signals selected by the signal selector from the baseband signal, and outputs a result signal.

The first detector comprises: a plurality of first fingers for dispreading corresponding path signals of received signals to decide respective channel estimates, and respectively regenerating the received signals to generate the regeneration signals; a first maximal ratio combiner (MRC) for using the channel estimates to combine the signals despread by the first fingers with a maximal ratio; a signal selector for performing a temporary hard bit decision on a soft bit decision value obtained through the first MRC, and regenerating a received signal through a process identical with that of transmission; and an SIR measurer for using signals output from the first MRC and the channel estimates to decide the SIR measurement value of the received signals.

The interference cancellation section further comprises at least one second interference cancellation unit connected in series to the first interference cancellation unit, and the second interference cancellation unit receives a signal output from the first adjacent interference cancellation section or a second interference cancellation section, and comprises the first detectors, the signal selector, and the subtractor.

The final decision unit of the interference canceller comprises a plurality of second detectors connected in parallel for receiving a signal from the interference cancellation section, and each second detector comprises: a plurality of second fingers for despreading the signal output from the interference cancellation section; a second MRC for combining the signals despread and output from the second fingers with a maximal ratio and outputting a soft bit decision value; and a hard bit decision unit for performing a bit decision on the soft bit decision value to output a final hard bit decision value.

In another aspect of the present invention, an interference cancellation method in a mobile communication system comprises: providing a baseband signal to the detectors, and using the soft bit decision values decided by the MRCs of the detectors and the channel estimates of the received signals for each path obtained from the fingers to measure SIRs of the signals input to the respective detectors; comparing the SIRs measured by the detectors with a predetermined target SIR, and selecting first regeneration signals that have the measured SIRs greater than the target SIR and that are regenerated and output by the detectors; and subtracting the first regeneration signals from the baseband signal.

The method further comprises: providing the baseband signal from which the first regeneration signal has been subtracted to the detectors, and measuring the SIRs of the signals input to the respective detectors; comparing the SIRs measured by the detectors with a predefined target SIR to select a second regeneration signal that has the measured SIR greater than the target SIR and is regenerated and output from the detectors; and subtracting the selected second regeneration signal from the baseband signal.

In still another aspect of the present invention, an interference canceller in a mobile communication system comprises a plurality of interference cancellation units connected in series, including a plurality of detectors connected in parallel, a signal selector for comparing SIR measurement values respectively measured by the detectors with a target SIR to select regeneration signals that have the SIR measurement values greater than the target SIR and are regenerated by the detectors, and a subtractor for subtracting the regeneration signal selected by the signal selector from a first received signal, wherein the detector comprises: a plurality of fingers for despreading second received signals input to the detector for each path to respectively determine channel estimates, and regenerating the second received signals to generate the regeneration signals; a maximal ratio combiner (MRC) for using the channel estimates to combine the signals despread by the fingers for each path with a maximal ratio to perform a soft bit decision; and an SIR measurer for using the soft bit decision value decided by the MRC and the channel estimates to determine the SIR measurement value of the second received signals, and the second received signals input to the detectors of the interference cancellation unit are output from the subtractor of an adjacent interference cancellation unit, and the first received signal is input to detectors of a first interference cancellation unit of the interference cancellation section.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
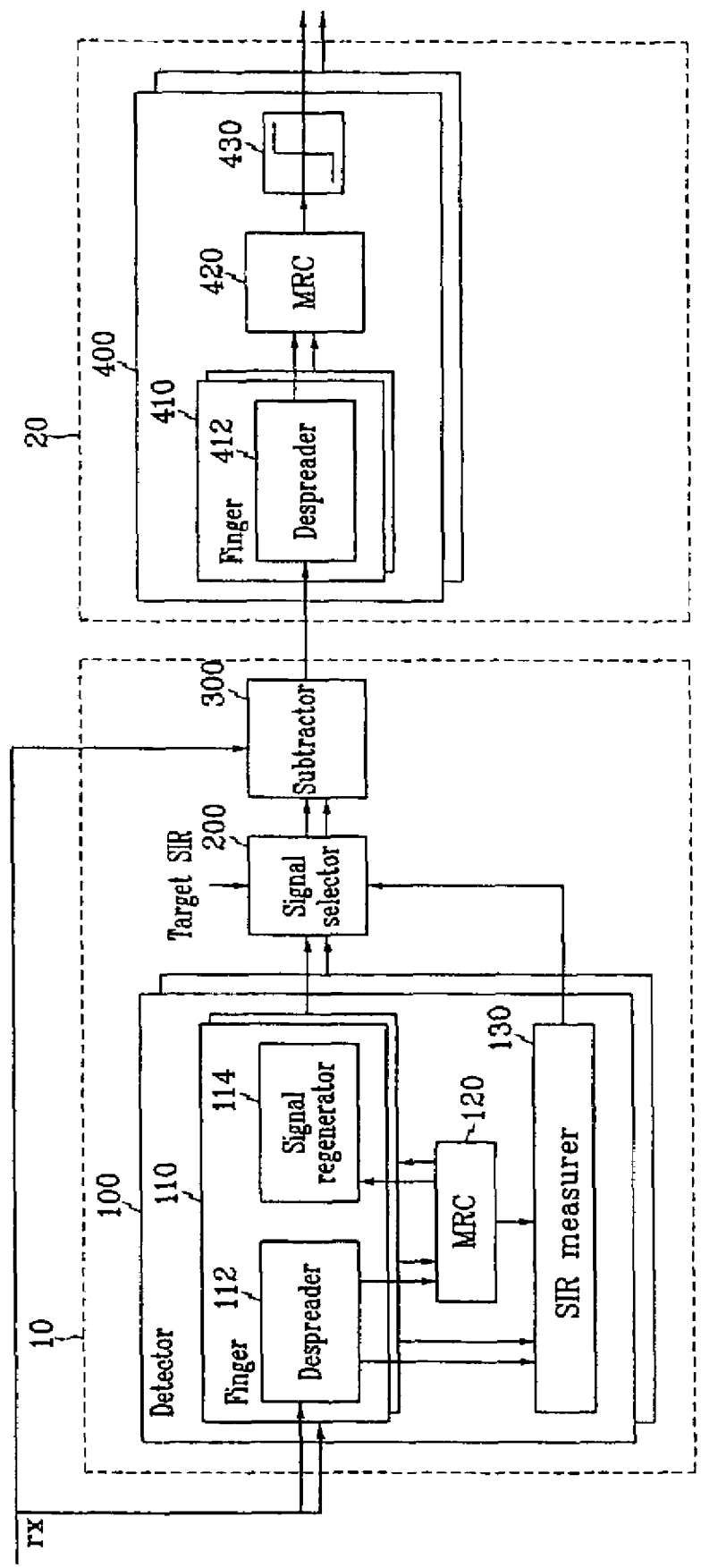
FIG. 1 shows a block diagram of an interference canceller according to a first preferred embodiment of the present invention.

FIG. 1 shows a block diagram of an interference canceller according to a first preferred embodiment of the present invention.

As shown, the interference canceller comprises an interference cancellation unit 10 and a final decision unit 20. In general, the interference canceller receives digital signals from a mobile station through a receiver antenna (not illustrated), and the digital signals are converted into IF (intermediate frequency) signals through a carrier frequency demodulator and an analog/digital (A/D) converter. The IF signals are converted into baseband signals through a root pulse shaping filter (not illustrated) identical with that used by each mobile station for transmission, and they are stored in a buffer (not illustrated). The interference canceller receives the baseband signals stored in the buffer, and cancels the interference.

The interference cancellation unit 10 cancels interference of the baseband signals for each group, and it comprises a plurality of detectors 100 connected in parallel, a signal selector 200, and a subtractor 300. The detectors 100 respectively receive baseband signals from a buffer, and each detector comprises a plurality of fingers 110 connected in parallel, a maximal ratio combiner (MRC) 120, and an SIR (signal to interface ratio) measurer 130. The fingers 110 of each detector 100 receive baseband signals to detect a plurality of multi-path signals, and each finger comprises a despreader 112 and a signal regenerator 114.

The despreader 112 uses the input baseband signals to generate PN codes matched with those used for the transmitted signals, uses the PN codes to despread the baseband signals, and detects the respective users' multi-path signals. The despreader 112 also estimates channel parameters including amplitudes, phases, and power values to estimate channels. The signal regenerator 114 performs a hard bit decision on the values obtained from the maximal ratio combiner 120, spreads them in the like manner of the signal transmission case, and uses a channel estimate obtained from the despreader 112 to regenerate the received signals.

The maximal ratio combiner (MRC) 120 uses the channel estimate to combine the signals despread and output from the fingers 110 in the maximal ratio combination method, and performs a soft bit decision on them. The SIR measurer 130 uses a soft bit decision value obtained from the MRC 120 and the channel estimate obtained from the fingers 110 to measure signal power, interference, and noise power, and finds an SIR.

The signal selector 200 compares a target SIR determined according to the BER required by the mobile communication system with the SIRs respectively measured by the SIR measurers 130 of the detectors, turns an inner switch on or off according to a comparison result, and selects signals output from the detectors 100. That is, the signal selector 200 selects the signals of measured SIRs that are greater than the target SIR, and that are regenerated from the detector 100, as a group. The subtractor 300 subtracts the signal selected by the signal selector 200 from the baseband signal output from the buffer to cancel interference.

The final decision unit 20 comprises a plurality of detectors 400 for receiving interference-canceled signals from the interference cancellation unit 10. Each detector 400 comprises a plurality of fingers 410 connected in parallel, an MRC 420, and a hard bit decision unit 430. Each finger 410 comprises a despreader 412 in the like manner of the finger 110, and it detects a plurality of multi-path signals and estimates a channel. The MRC 420 combines the signals despread and output from the fingers 410 with the maximal ratio to output a soft bit decision value. The hard bit decision unit 430 performs a hard bit decision on the soft bit decision value, determines the bit to be '1' when the decision-performed value is not a negative number, and determines the bit to be '−1' when it is a negative number.

A method for canceling the interference by the interference canceller will now be described in detail.

First, the baseband signal from the buffer is input to the respective detectors 100 of the interference canceller, and the baseband signal input to the detectors 100 is input to the fingers 110. Each finger 110 despreads the baseband signal through the despreader 112 to detect the respective users' multi-path signals and estimate a channel of the baseband signal. Next, the MRC 120 uses the signal that is despread and output by the finger 110 and the channel estimate to perform a soft bit decision.

A hard bit decision value is input to the signal regenerator 114, and the signal regenerator 114 uses a soft bit decision value and the channel estimate obtained from the despreader 112 to regenerate the baseband signal. The soft bit decision value and the channel estimate obtained from the despreader 112 are input to the SIR measurer 130, and the SIR measurer 130 measures a signal power, interference, and noise power to find an SIR.

The SIR measurement value measured by the SIR measurer 130 of each detector 100 and the regeneration signal of the signal regenerator 114 are input to the signal selector 200 in the interference canceller. The signal selector 200 compares the SIR measurement values of each detector 100 with the target SIR, selects the regeneration signal output from the corresponding detector 100 when the SIR measurement value is greater than the target SIR, and does not select the regeneration signal of the corresponding detector 100 when the SIR measurement value is not greater than the target SIR. Accordingly, the signal selector 200 groups the regeneration signals of the detectors 100. The subtractor 300 subtracts the regeneration signals selected from the signal selector 200 for the respective groups from the baseband signal output from the buffer to cancel the interference.

Next, remaining signals from which the interference has been canceled by the interference cancellation unit 10 are respectively input to the detectors 400 in the final decision unit 20. The MRC 420 in the detector 400 combines the signals despread by the detector 400 with the maximal ratio to output a soft bit decision value, and the hard bit decision unit 430 performs a final hard bit decision on the soft bit decision value to finally decide one of a '1' or '−1' value, and outputs the same.

In the first preferred embodiment of the present invention, a single interference cancellation unit 10 is used to cancel the interference, and in the actual application case, a plurality of interference cancellation units 10 is used to sequentially cancel the interference for respective groups, which will now be described in reference to FIG. 2.

Figure 2:
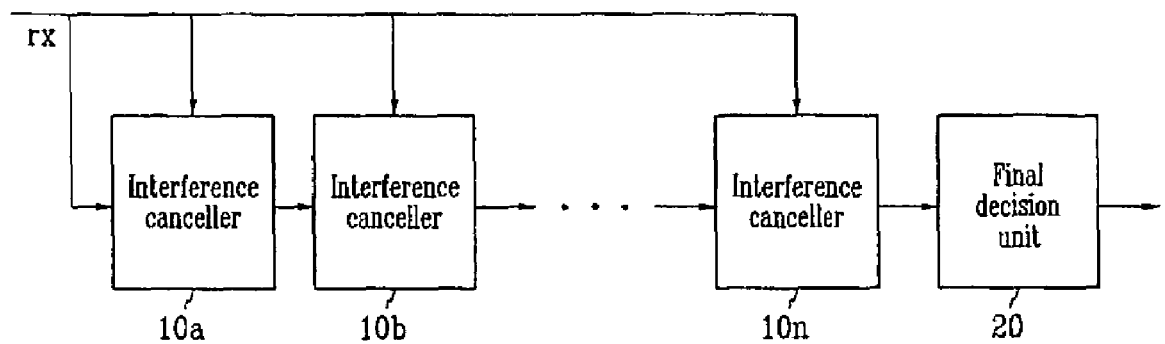
FIG. 2 shows a brief block diagram of an interference canceller according to a second preferred embodiment of the present invention.

FIG. 2 shows a brief block diagram of an interference canceller according to a second preferred embodiment of the present invention.

As shown, the interference canceller according to the second preferred embodiment has a configuration identical to that of the first preferred embodiment except for a plurality of interference cancellation units 10a through 10n.

In detail, the interference cancellation units 10a through 10n are connected in series, and have a configuration matched with that of the interference cancellation unit 10 according to the first preferred embodiment. The interference cancellation units 10a through 10n form a single interference cancellation section. The interference cancellation unit 10a receives a baseband signal from a buffer to cancel interference in the like manner of the interference cancellation unit 10 of the first preferred embodiment. Next, a plurality of detectors 100 of the interference cancellation unit 10b receive remaining interference-canceled signals from the interference cancellation unit 10a instead of the baseband signal. Through a process identical with the above-described one, the detectors 100 of the interference cancellation unit 10b regenerate remaining signals and measure an SIR. The signal selector 200 of the interference cancellation unit 10b uses the measured SIR to group regeneration signals of the remaining signals and select them, and the subtractor 300 of the interference cancellation unit 10b subtracts the selected regeneration signals from the baseband signal and outputs results. In a like manner, the interference cancellation units 10c through 10n receive signals subtracted and output from the subtractors 300 of the respective interference cancellation units 10b through 10n, and cancel the interference of the baseband signals.

The baseband signal from which the interference has been canceled by the previous interference cancellation unit 10n is input to the final decision unit 20 to be hard-bit-decided as one of values '1' and '−1', and is finally output as the corresponding value.

When a required BER of a system is given under any circumstance, the system groups received signals and cancels interference for respective groups, thereby enhancing the system's performance and capacity compared to the conventional group-wise interference cancellation methods.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An interference canceller in a mobile communication system, comprising:
    an interference cancellation section comprising a first interference cancellation unit including a plurality of first detectors connected in parallel for receiving a baseband signal, a signal selector for comparing SIR (signal to interference ratio) measurement values respectively measured by the first detectors with a predetermined target SIR and selecting regeneration signals that have SIR measurement values greater than the target SIR and which are regenerated from the first detectors, and a subtractor for subtracting the regeneration signals selected by the signal selector from the baseband signal, the interference cancellation section receiving the baseband signal, and
    a final decision unit for receiving signals from the interference cancellation section, and performing a hard bit decision,
    wherein the first detector comprises:
    a plurality of first fingers, each first finger comprising a despreader for despreading corresponding path signals of received signals to determine respective channel estimates, and a regenerator for using a soft bit decision value and each of the channel estimates to generate the regeneration signals;
    a first maximal ratio combiner (MRC) for using the channel estimates to combine the signals despread by the first fingers with a maximal ratio and perform a soft bit decision on the combined signals to determine the soft bit decision value; and a SIR measurer for using the soft bit decision value output from the first MRC and the channel estimates to determine the SIR measurement value of the received signals.

2. The interference canceller of claim 1, wherein the interference cancellation section further comprises at least one second interference cancellation unit connected in series to the first interference cancellation unit, and the second interference cancellation unit receives a signal output from the first adjacent interference cancellation section or a second interference cancellation section as the received signal, and comprises the first detectors connected in parallel, the signal selector, and the subtractor.

3. The interference canceller of claim 1, wherein the final decision unit comprises a plurality of second detectors connected in parallel for receiving a signal from the interference cancellation section, and each second detector comprises: a plurality of second fingers for despreading the signal output from the interference cancellation section; a second MRC for combining the signals despread and output from the second fingers with a maximal ratio and outputting a soft bit decision value; and a hard bit decision unit for performing a bit decision on the soft bit decision value to output a hard bit decision value.

4. The interference canceller of claim 1, wherein the target SIR is determined according to a bit error rate (BER) required by the mobile communication system.

5. An interference cancellation method in a mobile communication system including at least one interference cancellation unit including a plurality of detectors in parallel including: a plurality of fingers for receiving signals, determining a channel estimate of the received signal for each corresponding path, and respectively despreading the received signals; and a maximal ratio combiner (MRC) for combining the received signals despread and output from the fingers with a maximal ratio to perform a soft bit decision to determine soft bit decision values, comprising:

providing a baseband signal to the detectors, and using the soft bit decision values decided by the MRCs of the detectors and the channel estimates of the received signals for each path obtained from the fingers to measure SIRs of the signals input to the respective detectors;

comparing the SIRs measured by the detectors with a predetermined target SIR, and selecting first regeneration signals that have the measured SIRs greater than the target SIR and are regenerated and output by the detectors; and subtracting the first regeneration signals from the baseband signal.

6. The method of claim 5, further comprising:

providing the baseband signal from which the first regeneration signal has been subtracted to the detectors, and measuring the SIRs of the signals input to the respective detectors;

comparing the SIRs measured by the detectors with a predefined target SIR to select a second regeneration signal that has the measured SIR greater than the target SIR and is regenerated and output from the detectors; and subtracting the selected second regeneration signal from the baseband signal.

7. The method of claim 5, wherein the target SIR is determined according to a bit error rate (BER) required by the mobile communication system.

8. An interference canceller in a mobile communication system, comprising a plurality of interference cancellation units connected in series, including a plurality of detectors connected in parallel, a signal selector for comparing SIR measurement values respectively measured by the detectors with a target SIR to select regeneration signals that have SIR measurement values greater than the target SIR and are regenerated by the detectors, and a subtractor for subtracting the regeneration signal selected by the signal selector from a first received signal, wherein the detector comprises:

a plurality of fingers, each finger comprising a despreader for despreading corresponding path signals of second received signals to determine respective channel estimates, and a regenerator for using a soft bit decision value and a corresponding channel estimate to regenerate the second received signals to generate the regeneration signals;

a maximal ratio combiner (MRC) for using the channel estimates to combine the second received signals despread by the fingers with a maximal ratio and perform a soft bit decision on the combined signals to determine the soft bit decision value; and a SIR measurer for using the soft bit decision value decided by the MRC and the channel estimates to determine the SIR measurement value of the second received signals, and the second received signals input to the detectors of the interference cancellation unit are output from the subtractor of an adjacent interference cancellation unit, and the first received signal is input to detectors of a first interference cancellation unit of the interference cancellation section.

* * * * *